US011739814B2

(12) United States Patent
Bulgrien et al.

(10) Patent No.: US 11,739,814 B2

(45) Date of Patent: Aug. 29, 2023

(54) RELATING TO DUAL-CLUTCH TRANSMISSIONS

(71) Applicant: CNH Industrial America LLC, New Holland, PA (US)

(72) Inventors: Garth H. Bulgrien, Ephrata, PA (US); Enrico Sedoni, Modena (IT)

(73) Assignee: CNH Industrial America LLC, New Holland, PA (US)

( * ) Notice: Subject to any disclaimer, the term of this patent is extended or adjusted under 35 U.S.C. 154(b) by 753 days.

(21) Appl. No.: 16/762,137

(22) PCT Filed: Nov. 6, 2018

(86) PCT No.: PCT/EP2018/080265

§ 371 (c)(1),
(2) Date: May 6, 2020

(87) PCT Pub. No.: WO2019/091953

PCT Pub. Date: May 16, 2019

(65) Prior Publication Data

US 2020/0393020 A1 Dec. 17, 2020

(30) Foreign Application Priority Data

Nov. 9, 2017 (IT) ........................ 102017000128019

(51) Int. Cl.
*F16H 3/00* (2006.01)
*F16H 3/093* (2006.01)
(Continued)

(52) U.S. Cl.
CPC ............. *F16H 3/006* (2013.01); *F16H 3/085* (2013.01); *F16H 3/093* (2013.01); *F16H 37/043* (2013.01);
(Continued)

(58) Field of Classification Search
CPC .......... F16H 3/006; F16H 3/085; F16H 3/093; F16H 37/043; F16H 61/688;
(Continued)

(56) References Cited

U.S. PATENT DOCUMENTS 5,429,005 A * 7/1995 Fukui ...................... F16H 61/04 74/335
5,603,242 A * 2/1997 Krieger .................. F16H 3/006 74/335
(Continued)

FOREIGN PATENT DOCUMENTS

DE 10232839 2/2004
EP 2075487 7/2009

OTHER PUBLICATIONS

International Search Report and Written Opinion for International Application No. PCT/EP2018/080265 dated Jan. 24, 2019 (12 pages).

*Primary Examiner* — Ha Dinh Ho
(74) *Attorney, Agent, or Firm* — Rickard DeMille; Rebecca Henkel

(57) ABSTRACT

A dual-clutch transmission includes an odd gears clutch, an odd gears shaft supporting at least two odd-numbered rotary gears, an even gears clutch, and an even gears shaft supporting at least two even-numbered rotary gears. A driven rotary shaft is selectively connectable to one respective said odd- or even-numbered gear at a time. The dual-clutch transmission includes first and second range selection gears to transfer drive from the driven rotary shaft to an output shaft so as selectively to permit selection of at least a first range transmission ratio or a second range transmission ratio. The dual-clutch transmission further includes a first bypass drive line to drive engagement of at least two
(Continued)

mutually engaged bypass rotary gears with the output shaft, giving rise to a first intermediate transmission ratio.

15 Claims, 2 Drawing Sheets

(51) Int. Cl.
*F16H 61/688* (2006.01)
*F16H 37/04* (2006.01)
*F16H 3/085* (2006.01)
*F16H 3/08* (2006.01)

(52) U.S. Cl.
CPC ..... *F16H 61/688* (2013.01); *F16H 2003/008* (2013.01); *F16H 2003/0822* (2013.01); *F16H 2037/045* (2013.01); *F16H 2200/0078* (2013.01)

(58) Field of Classification Search
CPC ....... F16H 2003/008; F16H 2003/0822; F16H 2037/045
USPC ................................................ 74/330, 665 G
See application file for complete search history.

(56) References Cited

U.S. PATENT DOCUMENTS 6,591,705 B1 * 7/2003 Reik ...................... B60W 10/11 74/345
8,100,034 B2 * 1/2012 Gitt ...................... F16H 3/0915 74/745
2006/0185456 A1 * 8/2006 Gerlofs ................... F16H 61/16 74/325
2006/0219033 A1 * 10/2006 Gitt ........................ F16H 3/006 74/330
2011/0296937 A1 * 12/2011 Miller ..................... F16H 61/70 74/325
2015/0126321 A1 * 5/2015 Mittelberger ......... F16H 37/046 74/331
2015/0226295 A1 * 8/2015 Forsberg ................ F16H 3/097 475/207
2015/0267778 A1 9/2015 Peterson et al.

* cited by examiner

RELATING TO DUAL-CLUTCH TRANSMISSIONS

CROSS REFERENCE TO RELATED APPLICATIONS

This application is a US National Stage filing of International Application Serial No. PCT/EP2018/080265 entitled "IMPROVEMENTS IN OR RELATING TO DUAL-CLUTCH TRANSMISSIONS," filed Nov. 6, 2018, which claims priority to Italian Application Serial No. 102017000128019, filed Nov. 9, 2017, each of which is incorporated by reference herein in its entirety for all purposes.

BACKGROUND OF THE INVENTION

The invention relates to a dual-clutch transmission (DCT), for a vehicle.

In common with all variable vehicle transmissions a DCT converts rotary drive input from an engine crankshaft to a rotary drive output that is fed to e.g. a differential or other final drive assembly, with a transmission ratio taking effect between the rotary input and output; and the inclusion of an ability to select the prevailing transmission ratio.

DCT's were developed initially for use in race cars, very high performance supercars and a few high-performance motorcycles. DCT's are desired in such applications partly because they can readily be configured as either fully automatic transmissions, or semi-automatic transmissions (in which a vehicle driver can effect sequential gear shifting e.g. through the use of steering wheel-mounted shift paddles or shift lever buttons) while providing for very quick transmission ratio shift times.

A characteristic of a DCT is the presence of two parallel transmission paths only one of which is powered at any one time. This permits the pre-selection of the next (either higher or lower) ratio in a sequence in an unpowered branch of the transmission before the drive path through the transmission is caused to pass from one branch to the other, by way of a pair of clutches only one of which transmits drive at any one time.

Pre-selection in this way permits part of the shifting motion of components in the transmission to take place in a transfer path that by reason of disconnection at its clutch is not powered. This means that the remaining steps in the process of the transmission shift that result in the disconnection of one ratio from the final drive and the engagement of the next in the sequence are of short duration, amounting essentially to the virtually simultaneous switching of two clutch assemblies; and in some examples take only a few milliseconds. This in turn minimises the amount of time for which the final drive is not subjected to driving torque, and therefore provides for good acceleration performance in powerful cars.

DCT's are not particularly commonplace in more mundane passenger cars, partly because they require in effect two parallel gear trains to be built inside the gearbox and the cost of this for numerous reasons is not justified in most family and commuter car designs. Also the benefit of very quick transmission shifts is negligible in many cars of this type, although some passenger car manufacturers have increased the availability of DCT technology across their vehicle ranges in recent years.

Larger working vehicles on the other hand can more obviously benefit from the installation of dual-clutch transmissions. This is partly because large, powerful vehicles such as combine harvesters, tractors, loaders, some railcars, excavators including but not limited to backhoe loaders, other construction vehicles, snowmobiles and transporters of various kinds are generally somewhat expensive to design and build. As a consequence the additional cost of a DCT represents a smaller percentage of the vehicle cost than in a passenger car, with the result that the provision of a DCT is more acceptable on economic grounds.

Also it is often important in large vehicles, such as those mentioned, for transmission shifts to take place very quickly so that the period during transmission ratio selections when the final drive is un-powered is kept as short as possible. This is because the inertia of rotating parts of a large working vehicle is generally high, with the result that such parts can decelerate rapidly when torque is interrupted. If the transmission shifts slowly the aforementioned effects in turn can cause inadvertent selection of an incorrect transmission ratio for the vehicle speed at the ratio engagement time; and hence can cause unacceptable slowing of a vehicle and increased fuel costs. A large vehicle transmission that is slow to shift can in some situations even have adverse safety implications e.g. if an incorrect ratio is selected as the vehicle accelerates from rest when exiting a road junction.

Large working vehicles moreover nearly always must be subject to sequential transmission shifts, at least when moving forwardly on roads. This is because the heavy masses of such vehicles and the loads they haul means that any skipping of ratios in a sequence during acceleration can lead to selection of an inappropriate ratio that may be beyond the ability of the torque of the vehicle engine to cope with. This causes slowing of the vehicle that may be unacceptable in road traffic situations; and could in an extreme case lead to stalling of the engine and/or damage to parts of the drive train.

As a result the drivers of large working vehicles almost without exception select transmission ratios in sequence at least during vehicle acceleration and when "engine braking" during deceleration. Such use is consistent with the normal mode of operation of an automatic or semi-automatic DCT.

A further reason that DCT's are suitable for use in large vehicles is that their transmissions require a much larger number of selectable ratios than the transmissions of (relatively light) passenger cars, which typically require five or six forward ratios and one reverse ratio. A large working vehicle in contrast might in a relatively simple version include at least 12 forward ratios and perhaps six reverse ratios, sometimes spread across two or more individually selectable ratio ranges.

The use of two parallel transmission paths within the DCT allows these to be accommodated without requiring the length of the transmission housing to be unacceptably great. Furthermore the cost of a DCT generally becomes easier to justify the larger the number of ratios in the transmission.

Large vehicle transmissions are sometimes equipped with a so-called powershift function. This is a set of control components that permits the engine of the vehicle to continue to rotate the large rotating masses of the driveline that otherwise would be de-powered during clutch activation forming part of a transmission shift. Thus in use of a powershift transmission the vehicle driver may maintain the accelerator or governor pedal depressed so as to power the vehicle, even while clutch activation takes place.

Causing the rotating masses to be powered during this time prevents them from decelerating, with the benefit that it is not necessary to accelerate them again as part of the transmission shift process. Moreover the use of some types of powershift controls means that the vehicle as a whole does not decelerate appreciably during the clutch activation steps. This maintains smooth progress of the vehicle, and reduces the consumption of fuel that would otherwise be needed for the purpose of accelerating the vehicle, any towed or carried load and parts of the driveline back to a previously prevailing driving speed.

A drawback of powershift transmissions however is that they are complex and costly. This is partly because of the need to include electronic controllers that prevent over-revving of the vehicle engine while clutch operations take place. Also it is necessary to provide (typically) hydraulic actuators for the clutch packs in order to prevent clutch slipping, which is much more likely during powershifts than when de-powering the driveline during conventional clutch-based transmission shifting. The heavy duty of the clutch packs and actuators means they are particularly expensive to manufacture and build.

In addition to the foregoing as mentioned it is known in working vehicles such as those mentioned above, and to which the invention pertains, to provide multiple transmission ratio ranges. Thus it is commonplace for a large working vehicle to include e.g. six or eight forward transmission ratios that may be output via a choice of two or in some vehicles three output gears giving rise to as many as 24 selectable transmission ratios. Thus depending on the number of selectable output gears two or three ranges may be provided that often are referred to as “low”, “medium” (if included) and “high” ranges. Such vehicles also include e.g. six or eight reverse gear ratios that are provided by making available typically only the lowest transmission ratio range when reverse driving is selected. It is possible to have the same number of reverse gear ratios as forward gear ratios with the possibility to use “low” “medium” and “high” ranges too.

Shifting between forward ratio ranges in a vehicle equipped with a Semipowershift transmission generally requires halting of the vehicle or at any rate a clutch operation in order to permit the deselection of the output gear of one range and selection of the output gear of another range. The ratio shifts representing the deselection of one ratio range in favour of another cannot be performed as powershift ones.

This requirement has adverse effects on fuel economy owing to the need to accelerate the entire vehicle mass and several large rotating parts following a range shift, which might take a second or more to complete. Therefore, a Semipowershift transmission is generally recommended for light vehicle weight or low inertias of the transmission components and finally to reduce costs of the components used in the transmission. Instead the possibility to perform a clutch operation during range shifts in which every potential transmission shift is of the powershift type identifies a Fullpowershift transmission type. Fullpowershift transmission is strongly recommended in all heavy duty uses when heavy vehicles and high transmission inertias are involved. In a DCT-equipped tractor and other working vehicles there is the possibility to include Powershift or Semipowershift capability as mentioned above.

It would be desirable to eliminate or at least ameliorate one or more disadvantages of Semipowershift DCT's in large working vehicles.

SUMMARY OF THE INVENTION

According to the invention in a broad aspect there is provided a dual-clutch transmission, for a vehicle, comprising an odd gears clutch and an associated odd gears shaft supporting at least two odd-numbered rotary gears, the odd gears clutch being for transmitting rotary input drive via a selected one of the odd-numbered rotary gears to a driven rotary shaft; an even gears clutch and an associated even gears shaft supporting at least two even-numbered rotary gears, the even gears clutch being for transmitting rotary input drive via a selected one of the even-numbered rotary gears to the driven rotary shaft, the driven rotary shaft being selectively connectable to one respective said odd- or even-numbered gear at a time and the odd and even gears clutches being arranged to transmit drive on a mutually exclusive basis, and the dual-clutch transmission including at least first and second range selection gears that are mutually exclusively releasably engageable to transfer drive from the driven rotary shaft to an output shaft so as selectively to permit selection of at least a first range transmission ratio or a second range transmission ratio between at least one said selected even or odd rotary gear and the output shaft whereby to permit selection of a relatively low output ratio range or a first higher output ratio range that is higher than the relatively low output ratio range; wherein the dual-clutch transmission further includes at least a first bypass drive line including at least two mutually engaged bypass rotary gears and a bypass clutch for selectively effecting driving engagement of at least two mutually engaged bypass rotary gears with the output shaft, the at least two mutually engaged bypass rotary gears when the bypass clutch is engaged giving rise to a first intermediate transmission ratio that is intermediate the highest gear ratio of the relatively low output ratio range and the lowest gear ratio of the first higher output ratio range.

An advantage of this arrangement is that the ability to select a ratio that lies intermediate the upper end of the relatively low output ratio range and the lower end of the first, higher output ratio range means that a ratio can be selected that smooths the transition from the relatively low output ratio range to the first higher ratio range. Selection of the first intermediate ratio may moreover, by reason of embodying of the parts of the bypass drive line in a similar form to those of the odd- and even-numbered gears, be effected as a powershift. This means that the selection of a ratio that bridges between the relatively low ratio range and the first higher ratio range may be done while the engine of the vehicle is under power; and there is no need for an operator-initiated clutch operation when shifting between ratio ranges. Thus for the first time vehicle manufacturers are able to offer powershift ratio selection across the whole set of transmission ratios of a DCT not merely within a single ratio range; and it is not necessary to slow or halt the vehicle when shifting between ratio ranges.

In practical embodiments of the invention preferably the first bypass drive line includes at least two pairs of mutually engaged rotary gears at least two of which are mounted on a bypass shaft and are selectively lockable thereto; and the dual-clutch transmission includes at least one bypass drive line selector that is capable of transmitting drive via one of the bypass shaft-mounted rotary gears at a time, the gear ratios resulting from transmission via the bypass shaft-mounted mounted rotary gears differing from one another whereby the bypass drive line is capable of giving rise to the first intermediate transmission ratio and a second intermediate transmission ratio.

Thus advantageously the bypass drive line may be manufactured in a form that accommodates three transmission ratio ranges, by providing for an intermediate transmission ratio that is intermediate the low ratio range and a first, higher ratio range; and a further, different intermediate transmission ratio that is intermediate the first, higher ratio range and a second, higher still ratio range.

However in some embodiments of the invention only two ratio ranges may be provided for. In such embodiments the bypass drive line may include a single pair of mutually engaged rotary gears, one of which is mounted on the bypass drive shaft. For the avoidance of doubt, the invention extends to such embodiments.

Preferably the bypass drive line selector is or includes a dog clutch that is moveable along the bypass shaft selectively to lock one or other of the bypass shaft-mounted rotary gears to the bypass shaft.

Such a selector is commonly used in a dual-clutch transmission as it permits the pre-selection of a particular ratio (or ratio range, as appropriate) in an efficient manner that may become the driving selection of a chosen ratio or ratio range on the engagement of the plates of a separate clutch. This gives rise to rapid gear changes. Thus the use of a dog clutch in connection with the selection of ratios that are intermediate the upper and lower ratios of respective ratio ranges may give rise to ratio selections that are as quickly effected as the ratio changes within a particular ratio range, made using the convention DCT technology that is present in the transmission of the invention. In turn this means that the selection of the intermediate transmission ratios may be made as powershift selections.

However it is within the scope of the invention to employ other means of selecting the ratios provided in the bypass drive line.

Optionally the dual-clutch transmission of the invention may include at least a third range selection gear that is releasably engageable to drive the driven rotary shaft so as selectively to permit selection of a third transmission ratio between at least one said selected even or odd rotary gear and the driven rotary shaft whereby to permit selection of a second, higher output ratio range. Further preferably the second, higher output ratio range is higher than the first relatively high output ratio range; and in such arrangements preferably the second intermediate transmission ratio is intermediate the highest gear ratio of the first higher output ratio range and the lowest gear ratio of the second higher output ratio range.

Thus the transmission of the invention may beneficially be configured in some embodiments to include three ratio ranges, being respectively a low range, a medium range and a high range. The transmission thus is rendered particularly suitable for incorporation in a vehicle such as an agricultural tractor, in which e.g. the low range might usually be selected during field work; the medium range might be used for towing; and the high range might be used when the tractor is travelling unencumbered on roads. The intermediate transmission ratios in such embodiments of the invention are selected to provide a median transmission ratio in each case that satisfactorily bridges the highest transmission ratio of a lower ratio range and the lowest transmission ratio of the next higher ratio range.

In preferred embodiments of the invention the bypass drive line includes a bypass clutch shaft having mounted thereon (a) a bypass input gear that transfers rotary input drive to the bypass drive line; (b) the bypass clutch; and (c) two said bypass rotary gears.

Such a construction of the main features of the bypass drive line gives rise to a beneficially compact arrangement.

Preferably the dual-clutch transmission of the invention includes an input drive shaft that is connected to the crankshaft of a spark-ignition or compression-ignition engine and that extends along the transmission generally parallel to the odd gears shaft and the even gears shaft that extend generally parallel to one another, the input drive shaft providing rotary input drive to the dual-clutch transmission.

The presence of an input drive shaft that extends parallel to the odd gears shaft and the even gears shaft additionally provides for a compact arrangement.

For the avoidance of doubt the invention is considered to extend to a vehicle, such as but not limited to an agricultural tractor, having a dual-clutch transmission as defined herein installed therein and connected to form part of the overall driveline of the vehicle.

In such an arrangement preferably the input drive shaft protrudes from the dual-clutch transmission as a power take-off (PTO) shaft. In a particularly preferred embodiment the PTO shaft protrudes from the opposite side of the dual-clutch transmission to that at which the input drive shaft is connected to the engine crankshaft as defined above.

Thus in a preferred embodiment of the invention regardless of the transmission ratio selected using the dual-clutch transmission of the invention, or if the transmission of the invention is in a neutral gear configuration, by reason of the input drive shaft protruding as aforesaid the PTO shaft may be arranged to rotate continuously at the crankshaft rotation speed.

Conveniently the input drive shaft includes secured thereto for co-rotation therewith an even gears drive gear that is drivingly engaged with an even gears shaft input gear providing rotary drive to a forward drive clutch that when engaged causes the selection of forward drive in the dual-clutch transmission.

As is known in some dual-clutch transmission designs the rotary drive input via the even gears drive gear may from the even gears shaft be transferred to the odd gears drive shaft by way of one or more gears forming a train one end of which meshes with the even gears drive gear to the odd gears shaft, where a the rotary drive is input to a reverse drive clutch.

In this regard in preferred embodiments of the invention the housing of the forward drive clutch is mounted for co-rotation with the housing of the even gears clutch; and further preferably the housing of the forward drive clutch includes mounted thereon a first transfer rotary gear that is meshed with and provides rotary drive to a second transfer drive gear mounted for co-rotation with the housing of a reverse drive clutch.

The housing of the reverse drive clutch is mounted for co-rotation with the housing of the odd gears clutch. Thus overall the arrangement of the invention provides a compact means of providing for selectable forward and reverse drive through the dual-clutch transmission, using a single input shaft.

In a further conveniently compact aspect when the dual-clutch transmission of the invention includes a bypass input gear as aforesaid it preferably also includes at least a first idler gear acting to transfer rotary drive between the first transfer rotary gear and the second transfer rotary gear, the first idler gear or a rotary member connected thereto providing rotary drive to the bypass input gear.

Optionally the dual-clutch transmission of the invention includes two or more dog clutches for selectively engaging drive to each said range selection gear.

The dual-clutch transmission of the invention in practical embodiments may include respective further transfer gears that are locked to the driven rotary shaft for the purpose of transferring rotary drive from even- and odd-numbered gears that are meshed with the transfer gears to the driven rotary shaft.

The further transfer gears may in some embodiments of the invention be each engaged with two gears being respectively an even-numbered gear and an odd-numbered gear. The transmission ratio between a said even-numbered gear and/or a said odd-numbered gear and the associated said transfer gear may be a one-to-one ratio, or may be a different ratio.

The even-numbered and odd-numbered gears that are meshed with a said transfer gear may each have the same number of teeth, with the gears that transfer drive to the even gears shaft and the odd gears shaft giving rise to differing ratios as between on the one hand the even-numbered gears and the associated transfer gears and on the other hand the odd-numbered gears and the associated transfer gears. Alternatively the even-numbered and odd-numbered gears that are meshed with each said transfer gear may have mutually differing numbers of teeth.

For the avoidance of doubt the invention relates to all vehicle types described herein. In the majority of cases such vehicles are ground-located vehicles that operate in fields, woodlands, mountain areas, jungle or bush, rice fields or other flooded cultivation areas and numerous other off-road locations, as well as on roads. However it is also known for such vehicles to operate in various non-ground locations such as but not limited to on bridges and other deck-like structures, on large ships, on elevated rails and on snow fields.

The invention extends to the use of the dual-clutch transmission as defined herein in all such locations.

BRIEF DESCRIPTION OF THE DRAWINGS

There now follows a description of preferred embodiments of the invention, by way of non-limiting example, with reference being made to the accompanying drawings in which.

DETAILED DESCRIPTION OF THE DRAWINGS

Figure 1:
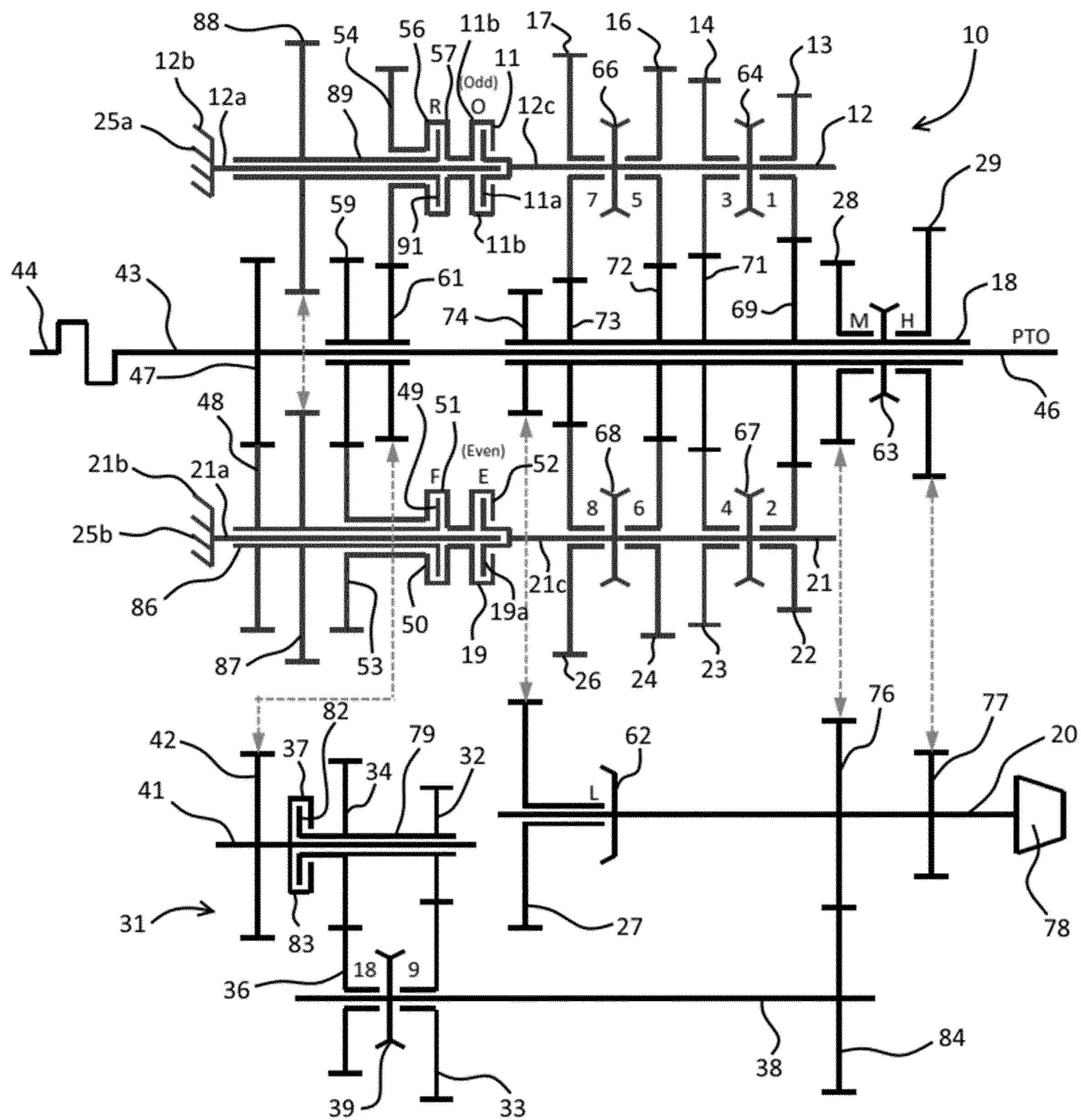
FIG. 1 is a schematic representation of a dual-clutch transmission according to the invention.

Referring to the drawings there is shown in schematic view a dual-clutch transmission (DCT) 10 according to the invention.

The preferred embodiment of DCT 10 in accordance with the invention includes a series of rotary components such as shafts, gearwheels, friction clutches, dog clutches and pinions that are supported in a transmission housing. The transmission housing in almost all embodiments of the invention is a metal casting that encloses the rotary components, some of which (such as input shafts, output shafts and power take-off (PTO) shafts) protrude from the interior of the transmission housing through the walls thereof to the outside, for the purpose of permitting rotary drive input and output.

The housing of the DCT in a typical case would contain a transmission fluid, typical compositions of which are known to the person of skill in the art, that may be circulated within the housing for the purposes of lubricating the moving parts thereof, providing cooling and in some cases providing hydraulic pressure that is employed in the DCT. Circulation of the oil may be effected e.g. by dedicated pumps or impellers that may be integral with the DCT 10 or may be external thereto; or by e.g. impeller features that are adjuncts to rotary parts that have other primary functions than causing the circulation of transmission fluid.

The rotary parts as aforesaid may be supported in bearings and in the case of rotary parts that protrude beyond the transmission housing seals may be provided that protect against transmission fluid egress and the ingress of contaminants. The person of skill in the art will be able to embody such aspects based on his/her existing knowledge.

The DCT 10 typically will include a plurality of actuators that cause the movement of various parts the positions of which are adjustable in order to cause chosen effects in the DCT. Such actuators may be mechanical, hydraulic, pneumatic or electrical, or may operate on the basis of combinations of such means.

The DCT 10 also may include or at least be operatively connected (e.g. wirelessly or by way of wired connections) to one or more control elements such as but not limited to selection levers, buttons, touchscreen icons and other controls. Such control elements may operate according to a variety of operational methods but in a typical case would be electrical or electronic components.

The DCT 10 also typically may include or be operatively connected to one or more processing devices such as but not limited to microprocessors. Any such processing device(s) may be operatively connected (e.g. wirelessly or by way of wired or circuit board connections) to e.g. one or more of the actuators and/or one or more of the control elements. The processing device(s) may be dedicated for the purpose of controlling the DCT 10 or may be multi-purpose, and may perform additional functions in a vehicle in which the DCT 10 is installed. The processor(s) may lie within the transmission housing or may be external to it.

FIG. 1 for clarity omits the majority of the aforementioned features, and illustrates solely the primary rotary components of the DCT 10 such as rotary shafts, friction clutches, dog clutches and gearwheels.

Figure 2:
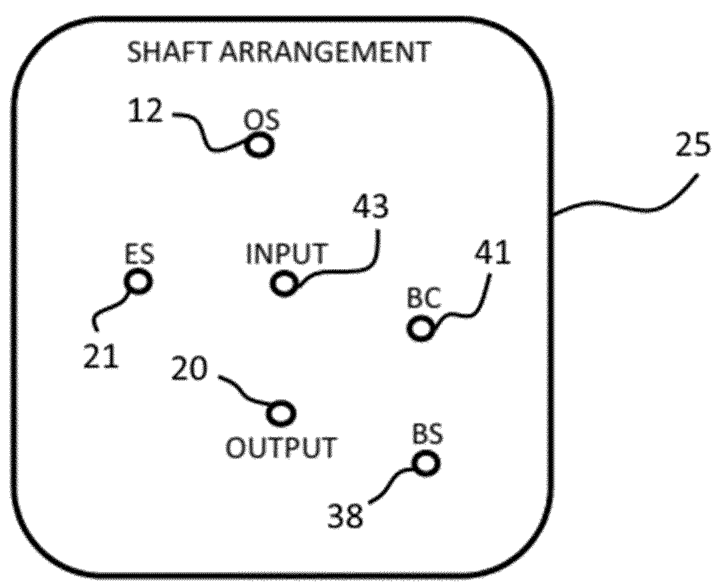
FIG. 2 is a schematic transverse cross-sectional view of the dual-clutch transmission of FIG. 1, showing the arrangement of the main shafts thereof.

The DCT 10 of FIGS. 1 and 2 in use typically would be installed so as to form part of the driveline of a vehicle such as but not limited to the vehicle types described herein. With the exception of the main engine crankshaft 44 FIG. 1 further for clarity omits the features of the vehicle in which the DCT is installed.

The majority of the illustrated features in FIG. 1 are manufactured from metals such as alloys that have been developed for use in vehicle transmissions. Friction parts such as the plates of friction clutches typically are manufactured from composite materials as are known to the person of skill in the art.

Parts of the DCT 10 may be manufactured as modules or cassettes/cartridges the aim of which is to simplify assembly and maintenance operations. FIG. 1 shows one way, described below, in which a cassette approach to constructing the DCT 10 may be employed, but other such methods lie within the scope of the invention as claimed. It is not essential that any part of the DCT 10 is constructed using cassette or cartridge, or other modular, design principles.

The gears of the DCT 10 are in the preferred embodiment toothed gears the teeth of which are designed to mesh with counterpart teeth formed on other gears of the DCT 10. However other methods of transferring rotary drive from one gear to another, as will be known to the person of skill in the art, are at least theoretically possible within the scope of the invention as claimed.

In the following the primary novel operating aspects of the DCT 10 will be described first. There then will follow a description of the means by which rotary drive may be input to and output from the DCT 10.

In DCT 10 an elongate, rotary odd gears shaft 12 extends from one end, designated the front end F of the transmission housing, towards the rear end designated R. In the illustrated embodiment the front of the transmission housing corresponds generally to the forward end of a vehicle in which the DCT 10 is installed, and the rear of the transmission housing corresponds generally to the rear of the vehicle. However this need not necessarily be the case, and the DCT 10 could for example be mounted transversely (as understood by automotive engineers) relative to the front and rear ends of the vehicle; or at any of a number of other orientations.

Odd gears shaft 12 supports odd gears clutch 11 part-way along its length. The portion 12*a* of odd gears shaft 12 that lies forwardly of odd gears clutch 11 is fixed against rotation, as signified schematically in FIG. 1 by anchor 12*b* by means of which shaft portion 12*a* is secured to a part 25*a* of the transmission housing.

The portion 12*c* of odd gears shaft 12 extending rearwardly of odd gears clutch is rotatable relative to portion 12*a*. Clutch plate 11*a* of odd gears clutch 11 is secured to odd gears shaft portion 12*c*. The housing 11*b* of odd gears clutch 11 is also rotatable relative to fixed odd gears shaft portion 12*a*. As a result when odd gears clutch 11 is engaged any rotary drive applied as described below to the housing 11*b* of clutch 11 is transferred to odd gears shaft portion 12*c*, which therefore rotates; and not to odd gears shaft portion 12*a* which as noted is fixed to the transmission housing part 25*a*. When odd gears clutch 11 is disengaged the rear portion 12*c* of odd gears shaft 12 is unpowered.

Odd gears clutch 11 could take a variety of forms within the scope of the invention. Thus clutch 11 cold be e.g. a dry plate clutch or a wet plate clutch and may include single or multiple plates. Typically in dual-clutch transmissions used in large working vehicles of the kinds described herein multi-plate wet plate clutches are used. This is because such clutches are better able than dry plate clutches to cope with the high torque values generated in the engines of large vehicles driving DCT shafts and gears. Moreover any energy losses resulting from the need to operate a clutch fluid pump in a wet plate clutch amount to a relatively small percentage of the overall losses in a large working vehicle (whereas in a passenger car they might be at an unacceptable level relative to vehicle engine output).

The rear portion 12*c* of odd gears shaft 12 supports four odd gears 13, 14, 16, 17. The odd gears are normally freely rotatable on the rear portion 12*c* of odd gears shaft 12, unless they are locked to the shaft through operation of odd gears dog clutches 64, 66 the operation of which is described in more detail below.

As is also described further below, the DCT 10 may operate in any of three ratio ranges being respectively a low ratio range, a medium or intermediate ratio range and a high ratio range. When the low ratio range is selected the odd gears 13, 14, 16 and 17 are respectively gears 1, 3, 5 and 7 of the low range; when the medium range is selected they are gears 1, 3, 5 and 7 of the medium range; and when the high ratio range is selected they are gears 1, 3, 5 and 7 of the high ratio range.

The odd gears dog clutches 64, 66 are secured on the odd gears shaft on splines such that the odd gears dog clutches 64, 66 co-rotate with the odd gears shaft regardless of the positions of the dog clutches. The dog clutches are each slideable on the splines to the left or the right so as to engage one or another adjacent gear 13, 14, 16, 17 at a time and lock it to the odd gears shaft.

The control components of the DCT 10, that typically include e.g. one or more programmable controllers such as ASIC's or other programmable devices and one or more actuators such as hydraulic, electric or magnetic motors, are arranged such that only one of the odd gears 13, 14, 16, 17 at a time may be locked to the odd gears shaft. This arises partly because each odd gears dog clutch 64, 66 when moved to one side or the other on the odd gears shaft to engage one of the odd gears becomes spaced from the other odd gear with which potentially it is engageable.

The periphery of each odd-numbered gear 13, 14, 16, 17 is meshingly engaged with a respective driven gear 69, 71, 72, 73. The driven gears 69, 71, 72, 73 are fixed at intervals along a driven rotary shaft 18 such that rotation of a said driven gear 69, 71, 72, 73 causes rotation of the driven rotary shaft 18. Various means of securing the driven gears 69, 71, 72, 73 to the driven rotary shaft 18 will be known to the person of skill in the art.

Since as explained the control of the odd gears dog clutches 64, 66 is such that drive in the odd gears shaft 12 is transmitted via only one of the odd-numbered gears 13, 14, 16, 17 at a time only one of the driven gears 69, 71, 72, 73 at a time will be active to drive the driven rotary shaft 18.

Even gears shaft 21 and its associated components are configured in a closely similar way to the odd gears shaft 12 and related components as described above.

Thus even gears shaft 21 includes a forward portion 21*a* that is secured against rotation by an anchor 21*b* fixing forward portion 21*a* to a part 25*b* of the transmission housing. Even gears shaft supports part-way along its length an even gears clutch 19 the housing 52 of which is rotatable relative to forward portion 21*a* of even gears shaft 21 and when the even gears clutch 19 is disengaged also the plate 19*a* of the even gears clutch. When even gears clutch on the other hand is engaged any rotary drive applied to the housing 52 of even gears clutch is transferred to the rear portion 21*c* of the even gears shaft that is fixed to the plate 19*a* of the clutch 19.

Even gears shaft rear portion 21*c* supports at intervals along its length a series of four (in the embodiment shown, although as noted other numbers of even-numbered gears are possible within the scope of the invention) even-numbered gears 22, 23, 24, 26.

The longitudinal positions of the even-numbered gears on the even gears shaft rear portion 21*c* are fixed in like manner to the fixing of the odd-numbered gears on odd gears shaft rear portion 12*c*. Also in like manner to the odd-numbered gears 13, 14, 16, 17 the even-numbered gears 22, 23, 24, 26 are freely rotatable on the even gears shaft rear portion 21*c* unless acted on by one of two even gears dog clutches 67, 68 that are also supported on the even gears shaft rear portion 21*c*.

The even gears dog clutches 67, 68 are very similar to the odd gears dog clutches 64, 66 and therefore are secured by way of splines that permit longitudinal movement along the even gears shaft rear portion 21*c* but prevent rotation of the dog clutches relative to this shaft portion 21*c*. As a result the even gears dog clutches 67, 68 may be caused to move to the left or the right as viewed in FIG. 1 in order to lock a selected even gear 22, 23, 24, 26 at a time to the even gears shaft rear portion 21*c* and thereby cause the transfer of rotary drive from the even gears shaft rear portion to the selected even-numbered gear 22, 23, 24, 26.

As in the case of the odd gears, the control elements of the DCT 10 are such as to prevent the operation of the even gears dog clutches 67, 68 to cause the selection of more than one even gear 22, 23, 24, 26 at a time. Moreover if at a given time an odd-numbered gear 13, 14, 16, 17 has been engaged by an odd gears dog clutch 64, 66 and the odd gears clutch

11 is engaged in a drive-transferring manner the control elements are such as to prevent the selection of any of the even-numbered gears; and vice versa. Such prevention is effected by maintaining the relevant even gears clutch 19 or odd gears clutch 11 (as required) in a disengaged condition and also by ensuring that no commands to cause engagement of the dog clutches of the shaft that is required to be de-selected are sent.

The positions of the even-numbered gears 22, 23, 24, 26 on the even gears shaft rear portion 21*c* are in register with the driven gears 69, 71, 72, 73 such that the even-numbered gears 22, 23, 24, 26 mesh with the driven gears 69, 71, 72, 73 and are capable of transferring rotary drive to them.

In a typical embodiment of the invention the odd-numbered gears 13, 14, 16, and 17 and the even-numbered gears 22, 23, 24 and 26 all have mutually differing numbers of teeth whereby a different transmission ratio is effected between a selected odd- or even-numbered gear on the one hand and its associated driven gear 69, 71, 72, 73 depending on whether the odd- or even-numbered gear is driven.

The DCT 10 includes at least two, and in the preferred embodiment illustrated three, range selection gears 27, 28, 29. Gear 27 is a low range selection gear; gear 28 is a medium or intermediate range selection gear; and gear 29 is a high range selection gear. The range section gears act between the driven rotary shaft 18 and various final drive components described below, and serve to engage one selected output gear range at a time depending on the driving requirements of the vehicle and e.g. one or more control parameters such as but not limited to the setting of the engine throttle or governor; the inclination on which the vehicle is moving; the status of one or more braking systems of the vehicle; the steering angle adopted by a steering system; the nature of any towed loads or attached implements; the quality of the fuel and/or the status of exhaust gas sensed by sensors forming part of the vehicle; and numerous other parameters that it may be possible to sense during operation of the vehicle.

Low range selection gear 27 is in the preferred embodiment of the invention located near the forward end of driven rotary shaft 18 and is meshed with an intermediate gear 74 that is permanently locked to driven rotary shaft 18 for co-rotation therewith.

Low range selection gear 27 is normally freely rotatable on an output shaft 20 unless locked thereto by a selectively operable first range selection dog clutch 62.

Dog clutch 62 is similar to the dog clutches 64, 66, 67 and 68 except that it is engageable with only one gear (low range selection gear 27) that may be either selected or disengaged as required.

Medium range selection gear 28 and high range selection gear 29 are normally freely rotatable on the rear end of driven rotary shaft 18 unless locked thereto by a further range selection dog clutch 63.

Dog clutch 63 is of a similar type to dog clutches 64, 66, 6 and 68 and therefore may move to either side in order to select one or other of the range selection gears 28, 29 at a time.

The medium and high range selection gears 28, 29 are respectively meshed with output gears 76, 77 that are permanently locked to output shaft 20 for co-rotation therewith.

The output shaft 20 provides rotary input to a differential or another kind of final drive assembly that transfer the rotary output of the DCT 10 to e.g. driven wheels or other ground-engaging members of the vehicle in which the DCT is installed.

The described arrangement of the range selection gears provides for an advantageously efficient use of space within the transmission housing. It is however possible that in other embodiments of the invention the low range selection gear 27 is mounted on the driven rotary member 18 adjacent the medium and high range selection gears 28, 29 with a further output gear (of a similar design to gears 76 and 77) secured on the output shaft 20 in replacement of the intermediate gear 74.

As their names imply, the low range selection gear 27, the medium range selection gear 28 and the high range selection gear 29 are used for the selection of the transmission ratio ranges mentioned above, with the result that each odd-numbered and even-numbered gear 13, 14, 16, 17, 22, 23, 24, 26 may be employed in the selection of three distinct transmission ratios.

As explained herein a problem with conventional DCT's that include multiple, selectable ratio ranges is that it is only possible to effect powershift ratio changes between the transmission ratios that lie within one and the same range. It is therefore necessary to halt the vehicle when it is required to shift between ranges.

The DCT 10 of the invention includes features, described below, that solve this difficulty.

Specifically the DCT 10 includes a bypass drive line 31 that includes a number of transmission components. These permit the selection of bypass ratios that lie intermediate the ratio ranges. The nature of the bypass drive line 31 is such as to permit the selection of the bypass ratios without depowering the DCT 10, i.e. in a powershift manner.

In more detail the bypass drive line 31 includes in the embodiment shown a first pair 32, 33 of meshed rotary bypass gears mounted respectively on a bypass clutch output shaft 79 and a bypass synchronisation shaft 38; and a second pair 34, 36 of meshed rotary bypass gears also mounted adjacent the first pair 32, 33, in a similar fashion, respectively on the bypass clutch output shaft 79 and the bypass synchronisation shaft 38.

The bypass rotary gears 32, 34 are locked to the bypass clutch output shaft 79 that is journalled (i.e. supported in bearings that permit rotation) and that terminates at one end in a bypass clutch plate 82 forming part of a bypass clutch 37. The housing 83 of bypass clutch 37 is fixed to a rotary bypass input gear 42 that in a manner described further below is able to receive rotary drive developed in a crankshaft 44 forming part of the engine of the vehicle in which the DCT 10 is installed.

At its rear end bypass synchronisation shaft 38 is connected to transfer rotary drive conveyed through the bypass drive line 31 to the output shaft 20. This is achieved by reason of a bypass output gear 84 that is locked to the bypass synchronisation shaft 38 and is meshed with output rotary gear 76 described above. Thus when drive is transferred via the bypass drive line 31 it is fed to the output shaft 20 and the differential or other final drive assembly 78.

Bypass input gear 42 is locked to bypass clutch shaft 41 to which bypass clutch housing 83 is also locked, such that rotation of bypass input gear 42 causes rotation of the housing 83 of the bypass clutch 37. Bypass clutch plate 82 is rotatable relative to bypass clutch housing 83 unless the bypass clutch 37 is engaged, in which case the rotary drive of bypass input gear 42 is transferred to the bypass rotary gears 32, 34 that are mounted on the bypass clutch output shaft 79 as described above, and thence to the rotary gears 33, 36 that are meshed with the gears 32, 34.

The rotary gears 33, 36 are normally freely rotatable on a bypass synchronisation shaft 38 unless locked thereto for rotation therewith by the action of a bypass driveline selector in the form of dog clutch 39.

Dog clutch 39 is similar to e.g. dog clutches 63, 64, 66, 67 and 68 in that it is non-rotatable relative to bypass synchronisation shaft 38 and is moveable to the left and the right as viewed in FIG. 1 under the influence of an actuator such as a hydraulic, magnetic or electric motor. The dog clutch 39 includes dogs that are progressively engageable with the rotary gears 33, 36. Thus if the dog clutch 39 is controlled to move to the right in FIG. 1 the rotary gear 33 becomes locked to bypass synchronisation shaft and co-rotates therewith. If the dog clutch 39 is driven to the left in FIG. 1 rotary gear 36 becomes similarly locked. The rotary gears 33 and 36 cannot simultaneously both become locked through the action of the dog clutch 39.

The dog clutch 39 preferably is mounted on the bypass synchronisation shaft 38 by way of longitudinally extending splines that extend along the bypass shaft 38 and co-operate with slots or grooved formed in an inner annulus wall of the dog clutch 38 in a manner that prevents rotation of the dog clutch 38 relative to the bypass synchronisation shaft 39 but allows movement along it. Other ways of securing the bypass driveline selector, and other designs of selector than the dog clutch 39 described above, are known in the art and may be employed as alternatives to the preferred arrangement.

Rotary drive developed in the engine crankshaft 44 is transferred by way of an input drive shaft 43 initially to cause rotation of rotary gear 47, that is herein the even gears drive gear.

Even gears drive gear 47 is meshingly engaged with an input gear 48 to even gears drive shaft 86.

Even gears drive shaft 86 extends to terminate in the plate 49 of a forward drive clutch 50.

The housing 51 of forward drive clutch 49 is locked to housing 52 of even gears clutch 19 so as to co-rotate therewith. As a result when forward drive clutch 49 is engaged rotary drive in even gears drive shaft 86 is transferred to even gears clutch 19; and when forward drive clutch 49 is disengaged there is no direct transfer of drive from even gears drive shaft 89 to even gears clutch 19.

The housing 51 of forward drive clutch includes supported thereon and locked thereto a first transfer rotary gear 53. The periphery of this is meshingly engaged with a first idler gear 59 that is supported on and freely rotatable relative to input drive shaft 43.

First idler gear 59 is in the preferred embodiment shown mounted on a common hub with second idler gear that is also rotatable relative to input drive shaft 43.

Second idler gear 61 is meshingly engaged with a second transfer rotary gear 54 that is mounted to be rotatable relative to odd gears shaft 12.

Second transfer rotary gear is supported by and locked to the housing 56 of a reverse drive clutch 57.

Housing 56 of reverse drive clutch 57 is locked to the housing 11*b* of odd gears clutch 11 such that rotary drive transmitted via housing 56 is input to odd gears clutch 11.

Even gears drive shaft 86 includes supported thereon and locked thereto a reverse drive transfer gear 87. As illustrated by dotted lines in FIG. 1 this is meshingly engaged with a reverse drive input gear 88 that is supported on and locked to a reverse drive input shaft 89. Reverse drive input shaft 89 terminates at its rear end in the plate 91 of reverse drive clutch 57.

It will be apparent from the foregoing that when forward drive clutch 49 is engaged and reverse drive clutch 57 is disengaged forward rotary drive input via input drive shaft 43 causes driving of the housings of both even gears clutch 19 (with drive being transferred via even gears drive gear 47, even gears shaft input gear 48, even gears drive shaft 86, forward drive clutch plate 49 and forward gears clutch housing 51, which last-mentioned as noted is locked to the housing 52 of even gears clutch 19); and odd gears clutch (with drive being further transferred via first transfer rotary gear 53, first idler gear 59, second idler gear 61, second transfer rotary gear 54 and reverse drive clutch housing 56 which last-mentioned as noted is locked to the housing 11*b* of odd gears clutch 11). In this configuration the input rotary drive to both the even gears clutch housing 52 and odd gears clutch housing 11*b* is in a so-called forward direction, that typically would correspond to forward motion of the vehicle in which the DCT 10 is installed.

The forward rotary drive may be transferred to the odd gears shaft or the even gears shaft depending on the states of the odd gears clutch 11 and the even gears clutch 19.

When forward drive clutch 49 is disengaged and reverse drive clutch 57 is engaged no drive is transferred via the first transfer rotary gear 53. Instead rotary drive in input drive shaft 43 is transferred via even gears drive gear 47 to co-rotative reverse drive transfer gear 87.

As explained, reverse drive transfer gear 87 is meshed e.g. at its periphery with reverse drive input gear 88 mounted on reverse drive input shaft 89. Such meshing of reverse drive transfer gear and reverse drive input gear causes reversal of the direction of rotation of reverse drive input shaft 89 compared to input drive shaft 43.

The drive input to reverse drive input shaft 89 is transferred directly to the plate 91 of reverse drive clutch 57. When reverse drive clutch 57 is engaged the rotation of plate 91 is transferred to the housing 56 of reverse drive clutch 57, which as explained is directly coupled to the housing 11*b* of odd gears clutch 11.

The rotative drive applied to housing 56 of reverse drive clutch 57 is in this situation also transferred to second transfer rotary gear 54 which is meshed with second idler gear 61. The connection of second idler gear 61 to first idler gear 59 causes rotation of the latter in the reverse drive direction explained above. Since first idler gear 59 is meshingly engaged with first transfer rotary gear 53 the reverse rotary drive then is input to the housing 51 of forward drive clutch 50.

The fact that in this condition the forward drive clutch 50 is disengaged means that the housing 51 thereof is freely rotatable, with the result that the reverse direction rotary drive is then input to the housing 52 of even gears clutch 19. Depending on whether the even gears clutch 19 is engaged or disengaged the reverse drive then may be input to the even gears shaft as desired. For the avoidance of doubt the reverse direction of rotation of the various shafts as described in the foregoing sections is such as to cause typically reversing movement of the vehicle.

Since second idler gear 61 is permanently meshed with bypass input gear 42, depending on the settings of the forward drive clutch 50 and the reverse drive clutch 57 either forward or reverse rotary drive is input to the bypass drive line 31. If bypass clutch 37 is engaged this results in the feeding of rotary drive via the bypass drive line 31 to bypass output gear 84 and thence to differential 78, via output gears 76 and 77 mounted on output shaft 20.

FIG. 2 shows how the various shafts 12, 20, 21, 38, 41 and 43 of the DCT 10 may in a preferred embodiment of the invention be arranged when viewed in elevational cross sectional view at a location near the front F of housing 25. FIG. 2 represents merely one possible configuration of the shafts that results in a compact frontal area of the DCT 10. Other layout options are possible within the scope of the invention.

It moreover is not essential for the relative fore- and aft positions of the various gears and clutches forming part of the DCT 10 to be as illustrated in FIG. 1 the configuration in which simply represents one of several possible internal transmission layouts falling within the scope of the invention.

At the rear end of the DCT 10 an elevational view taken from outside the housing 25 would show the output shaft 20 protruding via an aperture in the housing 25. As an optional feature a power take-off (PTO) shaft 46 also may protrude.

The PTO shaft 46 if present may as illustrated be simply an extension of the input shaft 43. In such a case the PTO shaft would rotate at the same speed as the crankshaft 43 of the engine. In some embodiments of the invention however it may be desirable to interpose between the crankshaft 43 and the PTO shaft 46 one or more further transmission ratio components that impose a ratio change resulting in the PTO shaft 46 rotating at a different speed than the engine crankshaft 43.

The exact number of gears provided may vary. Thus for example the first and second idler gears 59, 61 may in some embodiments of the invention be replaced by a single idler gear that is engaged on one side of its periphery with first transfer rotary gear 53 and on the other side of its periphery with second transfer rotary gear.

Clearly in such an arrangement however there may be less space on the periphery of the single idler gear for engagement with bypass input gear 42 as is a requirement in the DCT 10. Furthermore an arrangement in which three gears are meshed with a single idler gear may be sub-optimal because the idler gear may suffer excess wear and stress. For these reasons the two-idler gear arrangement of FIG. 1 is preferred.

The various mutually meshed gears in preferred embodiments of the invention mesh with one another about their outer peripheries but this need not be the case. Thus for example meshing of the inner peripheries of ring gears with the outer peripheries of further gears may be possible. As noted other ways of transferring rotary drive between components of the DCT 10, as will occur to the person of skill in the art are possible within the scope of the invention. As non-limiting examples dog teeth may be employed instead of gear teeth on the various gears; high-friction surfaces (such as rubberised surfaces) may be employed instead of meshing components; or drive gears or belts may be employed instead of meshing parts.

Clearly in order to avoid the simultaneous selection of conflicting drive paths in the DCT 10 the control components associated with the DCT 10 must provide for mutually exclusive operation of numerous parts of the DCT 10. Thus for example if the forward drive clutch 50 is engaged the reverse drive clutch 57 must be disengaged, and vice versa. Similarly the odd gears clutch 11 and the even gears clutch 19 cannot both be engaged at the same time; and if the bypass clutch 37 is engaged neither the odd gears clutch 11 nor the even gears clutch 19 may be engaged.

The various selectors constituted in the preferred embodiment of the invention as the dog clutches 39, 62, 64, 66, 67 and 68 must be controlled such that only a single gear at a time is powered to rotate. As explained above such operation of the various parts of the DCT 10 in preferred embodiments of the invention is achieved through the use of programmable devices such as ASIC's or similar devices that are connected to power actuators such as but not limited to solenoids, other electric motors, hydraulic motors or pneumatic motors. Appropriate operator controls such as levers, buttons, sliders, touch screen controls and proximity sensors may be provided e.g. in an operator's cab forming part of the vehicle.

Operation of the DCT 10 in the sequential selection of forward gears will now be described.

Following switching on of the vehicle engine the crankshaft 44 rotates in a forward rotational direction as defined herein. At powering up of the vehicle all the clutches are disengaged with the result that rotary drive is transmitted only to the plate 49 of forward drive clutch 50 (via even gears drive gear 47, even gears shaft input gear 48 and even gears drive shaft 86); and to the plate 91 of reverse drive clutch 57 (via reverse drive transfer gear 87, reverse drive input gear 88 and reverse drive input shaft 89). The PTO shaft 46 if present also at this time is rotating by reason of being an extension of the input drive shaft 43.

Since the rotary drive is transferred no further than the aforesaid clutch plates 49 and 91 no motion of the vehicle is caused to occur.

In order to move of from rest in a forward direction the vehicle operator selects forward Gear 1. This results in movement of dog clutch 64 to the right in FIG. 1 in order to lock odd gear 13 to odd gears shaft 12; movement of dog clutch 62 to the left to effect selection of the lowest available ratio range by locking low range selection gear to output shaft 20; and engagement of odd gears clutch 11. Such actions are controlled by the programmable device and motors of the DCT 10.

The operator then causes engagement of forward drive clutch 50, e.g. by a combination of (i) selecting between forward and reverse drive options (as may result from the movement of a two-position cab-mounted switch one position of which corresponds to forward drive selection and the other of which corresponds to reverse drive selection) and (ii) causing engagement of the forward drive clutch 50 e.g. by lifting of a clutch pedal that the operator typically would be required to press down during selection of forward or reverse drive.

When the DCT 10 is thus configured the rotary drive of forward drive clutch plate 49 is transferred to forward drive clutch housing 51 and thence via first transfer rotary gear 53, first idler gear 59, second idler gear 61, second transfer rotary gear 54, reverse drive clutch housing 56, odd gears clutch housing 11*b* and engaged odd gears clutch plate 11*a* to odd gears shaft 12 (to which odd gear 13 is locked by reason of the position of dog clutch 64).

This causes odd gear 13 to rotate in the same (forward) direction as crankshaft 44, the rotation being subject to a ratio determined by the diameters and the numbers of teeth of the various meshed gears in the transmission train described above.

Such rotation of odd gear 13 is transferred via driven gear 69 that is meshed with odd gear 13 to driven rotary shaft 18.

This in turn causes rotation of intermediate gear 74 that is meshed with low range selection gear 27. The latter rotates in the same direction as odd gear 13 by reason of the number of elements in the drive train between odd gear 13 and low range selection gear 27.

Since by reason of the state of dog clutch 62 low range selection gear 27 is locked to output shaft 20 the forward rotary drive, modified in accordance with the overall transmission ratio determined by the sizes and numbers of teeth of the various mutually engaged gears, is transferred to output shaft 20 and thence to the differential 78 or any other final drive component that may be present.

The output of the differential 78 is transferred to one or more driven ground-engaging members, such as wheels or tracks, of the vehicle. Assuming the vehicle brakes have by this stage been disengaged by the operator the vehicle then is powered to move off forwardly, with the precise nature of the motion being determined by a number of parameters such as but not including the setting of the vehicle throttle or governor pedal; any incline on which the vehicle stands; the mass of a towed trailer; any wheelslip resulting from the coefficient of friction between the ground-engaging member(s) and the ground; and so on.

After accelerating in Gear 1 for a short while the engine of the vehicle would reach a revolutions per minute limit or would exhibit a reduction in output torque by reason of the engine speed moving out of an optimal torque band. This point would be apparent to the vehicle operator, who then would select Gear 2 being a higher gear in the low ratio range than Gear 1.

As is well known a DCT operates according to the pre-selection of sequentially selected transmission ratios. Thus when the vehicle operator selects Gear 2 dog clutch 67 moves to the right in FIG. 1 to lock even gear 22 to even gears shaft 21.

Following this pre-selection step the operator may command switching of the transmission ratio from Gear 1 to Gear 2 through a control operation such as dipping of the clutch pedal. This results in disengagement of odd gears clutch 11 and virtually simultaneous engagement of even gears clutch 19. The train of drive transfer in the DCT 10 then alters within the few milliseconds needed for the aforesaid clutch adjustments such that rotation of the odd gears shaft 12 ceases; and forward rotation of even gears shaft 21 is effected by reason of rotary drive transferring from the plate 19*a* of even gears clutch 19 via the housing 52 thereof to rear portion 21*c* of even gears shaft.

This in turn causes locked even gear 22 to rotate forwardly. Since even gear 22 is meshed with driven gear 69 the output path of the forward rotary drive to the differential 78 then is the same as when the odd gear 13 was the selected gear.

The diameter and number of teeth of even gear 22 differ from this of odd gear 13 with the result that Gear 2 is a higher overall ratio than Gear 1.

Following further acceleration of the vehicle the operator may then pre-select Gear 3, thereby causing dog clutch 64 to move to the left and lock odd gear 14 to odd gears shaft 12. A further clutch dip or similar operation causes reversal of the engaged statuses of the odd and even clutches 11, 19. As a result the drive path once again resembles that prevailing when odd gear 13 was selected, with the exception that drive is transferred to the driven rotary shaft 18 via selected (locked) gear 14 and driven gear 71. This represents a higher transmission ratio than that provided by selection of even gear 22.

The operator may through a similar sequence cause the selection of Gear 4 by pre-selecting even gear 23 and effecting a clutch engagement reversal as described. The pre-selection of even gear 23 is the result of dog clutch 67 moving to the left as viewed in FIG. 1.

For the subsequent selection of odd gear 16 (Gear 5) the dog clutches 64 and 67 are moved to intermediate positions lying between the adjacent gears on either side, with the result that none of odd or even gears 13, 14, 22 or 23 is locked to driven rotary shaft 18.

Instead at this time the dog clutch 66 is moved to the right to cause locking of odd gear 16 to odd gears shaft 12. Following disengagement of even gears clutch 19 and engagement of odd gears clutch 11 the transmission of rotary drive then takes place via a similar propagation path to that prevailing during selection of odd gears 13 and 14, with the exception that drive to the driven rotary shaft 18 occurs as a result of meshing of odd gear 16 and driven gear 71, which latter is locked to driven rotary shaft 18.

As the vehicle accelerates the operator continues sequentially to select the numbered Gears 6, 7 and 8 (i.e. even and odd gears 24, 17 and 26 respectively) in order until Gear 8 (even gear 26) is engaged.

Gear 8 is the highest gear in the low ratio range.

In a prior art DCT at this point the operator would need to perform a range shift operation should there exist a need to engage a higher ratio gear than Gear 8. In the prior art this involved halting or at least significantly decelerating the vehicle while drive via the DCT effectively was disengaged; selecting a higher ratio range; and then re-accelerating the vehicle by way of a further sequence of transmission shifts within the selected higher ratio range. As noted this process was associated with significant inefficiencies.

Such problems are solved in the DCT 10 of the invention because of the presence of the bypass drive line 31.

When the operator requires to shift from e.g. the low ratio range described above to the medium ratio range the operational sequence involves effecting a control action (such as pushing of a selector button) that causes pre-selection of Gear 9, which is bypass rotary gear 33. Thus the pre-selection step results in dog clutch 39 moving to the right to lock bypass rotary gear 33 to bypass synchronisation shaft 38. Following this step the odd gears clutch 11 and even gears clutch 19 are disengaged; and bypass clutch 37 engaged.

This causes rotary drive acting at second idler gear 61 to be transferred to bypass input gear 42 by reason of the meshed engagement of second idler gear 61 and bypass input gear 42.

The rotary drive is then transferred vi the housing 83 and plate 82 of bypass clutch 37 to bypass clutch output shaft 79.

Bypass rotary gear 32 is locked to bypass output shaft 79 and as previously explained is also meshed with bypass rotary gear 33. Through this arrangement the bypass rotary gear 33 is driven to rotate, thereby in turn causing rotation of bypass synchronisation shaft 38.

This drives bypass output gear 84 that is meshingly engaged with output gear 76. The latter is locked to output shaft 20, which transfers the rotary drive to differential 78 or another final drive assembly as would be known to the person of skill in the art.

The overall ratio effected through the aforesaid selection of bypass rotary gear 33 is intermediate the highest ratio of the low ratio range (i.e. Gear 8) and the lowest ratio of the medium ratio range (i.e. Gear 10).

By reason of the bypass drive line 31 resembling a further branch of a DCT, selection of Gear 9 may take place as a powershift selection. Following such selection of Gear 9 acceleration of the vehicle may continue essentially uninterrupted notwithstanding the requirement for a ratio range shift.

As the vehicle moves with Gear 9 selected the operator may pre-select Gear 10, which as noted is the lowest ratio of the medium ratio range. Selection of Gear 10 involves effecting movement of dog clutch 64 to the right to once again lock rotary gear 13 to odd gears shaft 12. At this time dog clutch 62 is moved to the right in FIG. 1 in order to disengage the low ratio range; and dog clutch 63 is moved to the left in order to select the medium ratio range.

Such movement of dog clutch 63 causes locking of medium range selection gear 28 to driven rotary shaft 18.

Once the vehicle has accelerated sufficiently in Gear 9 the operator effects the range shift e.g. by dipping the clutch or performing another selection step. This effects disengagement of bypass clutch 37 and re-engagement of odd gears clutch 11. The transfer of rotary drive then is almost identical to that prevailing during the selection of Gear 1 with the low ratio range selected, with the exception that the rotary output of odd gears shaft 12 is transferred to differential 78 via medium ratio range selection gear 28, output gear 76 and differential 78.

Since the transmission ratio between medium ratio range selection gear 28 and output gear 76 differs from that existing between intermediate gear 74 and low ratio range selection gear 27 the odd-numbered gears 13, 14, 16 and 17 and the even numbered rotary gears 22, 23, 24 and 26 may be selected in order to provide a further eight transmission ratios in the medium ratio range.

The process of selecting the medium ratio range gears proceeds in a similar fashion to that described above in relation to the low ratio range, until Gear 17 (i.e. even-numbered gear 26 in the medium ratio range) is selected.

At this point the vehicle operator may wish to perform a second ratio range shift such that the high ratio range is selected. This might be required for example if a tractor is accelerating on a road.

At this point pre-selection of bypass rotary gear 36 occurs. Bypass rotary gear 36 corresponds to Gear 18, being a ratio intermediate the highest available ratio (Gear 17) of the medium ratio range and the lowest available ratio (Gear 19) of the high ratio range.

Pre-selection of bypass rotary gear 36 occurs as a result of movement of dog clutch 39 to the left as viewed in FIG. 1. This locks bypass rotary gear 36 to bypass synchronisation shaft 38. Engagement of bypass rotary gear 36 may then occur through a process of disengagement of even gears clutch 19 and engagement of bypass clutch 37, again through an operation such as but not limited to dipping of a clutch pedal. From this point the drive transfer path through the DCT 10 is again via the bypass drive line 31, this time with the gear ratio determined principally by the number of teeth of bypass rotary gear 36 and bypass rotary gear 34 that is supported on bypass clutch output shaft 79 and meshed with bypass rotary gear 36. The selection of Gear 18 as described may be effected as a powershift.

While the vehicle is accelerating with Gear 18 engaged pre-selection of the lowest ratio of the high ratio range may then occur. This is be effected by causing movement to the right of dog clutches 63 and 64 to cause locking of high ratio range selection gear 29 and odd-numbered gear 13 (which corresponds to Gear 19 in the sequence of gears available for selection) to the respective shafts on which they are mounted. Following such pre-selection the high ratio range may be engaged by, firstly, causing disengagement of bypass clutch 37 and then engagement of odd gears clutch 11.

Further acceleration of the vehicle may then take place, with sequential transmission powershifts occurring in the high ratio range in the manner generally described above, until the highest available ratio (i.e. Gear 26) is selected.

It is not necessary that all 26 transmission ratios are selected during acceleration of the vehicle. Thus for example if the vehicle is starting on a surfaced road on level ground without towing a trailer it is likely to be possible to commence acceleration in Gear 10, being the lowest ratio in the medium ratio range.

It furthermore is not necessary for the DCT 10 to include two bypass gears as described. Thus for example if the DCT includes only two ratio ranges (that might be labelled "low range" and "high range" respectively) it would be necessary for the bypass drive line to include only a single ratio arrangement that provides for powershifting at a ratio intermediate the two available ranges.

Although in the foregoing various actions are described in a particular order, it is not essential that all the steps of the operational method are completed in the order indicated. Thus for example during pre-selection of say Gear 10 while Gear 9 is engaged it may be a matter of indifference whether the medium ratio range is pre-selected before or after pre-selection of odd-numbered rotary gear 13 takes place.

When it is required to drive the vehicle in reverse, forward drive clutch 50 is disengaged and reverse drive clutch 57 is engaged. This causes the interposition of an extra rotary drive gear (reverse drive input gear 88) in the drive transmission path with the result that the direction of rotation of the elements of the transmission "downstream" of the reverse drive input gear 88 is the opposite to that prevailing during forward drive transmission. As a result the differential 78 is driven in reverse, thereby effecting reversing motion of the vehicle.

When reverse drive is selected the various control elements of the DCT 10 may operate to limit the number of ratio ranges that are available for selection. Thus for example it may be possible when reversing the vehicle only to select from Gears 1 to 8 constituting the low ratio range, with operation of the dog clutches 62 and 63 being inhibited.

In other embodiments of the invention however it is possible for reversing to take place using all available ratio ranges.

The following table (Table 1) summarises the statuses of the primary components of the DCT 10 in each of the selectable transmission ratios.

In Table 1 the column "Speed" signifies the selectable gear (Gear 1, Gear 2, etc.) and the legend "O E BC" indicates which of the odd, even and bypass clutches respectively is engaged for each gear selection.

The matrix of synchronisers in Table 1 signifies the rotary gears (identified according to gear number) that are locked to their shafts for each gear selection. The column "L M H" indicates which of the range selection gears 27, 28, 29 is powered for each gear selection.

TABLE 1

Torque Paths - apply clutch F for forward or R for reverse, plus the following:

| | Clutches | | | Synchronizers | | | | | | | | | | | | |
|---|---|---|---|---|---|---|---|---|---|---|---|---|---|---|---|---|
| Speed | O | E | BC | 1 | 2 | 3 | 4 | 5 | 6 | 7 | 8 | 9 | 18 | L | M | H |
| 1 | X | | | X | | | | | | | | | | X | | |
| 2 | | X | | | X | | | | | | | | | X | | |

TABLE 1-continued

| Torque Paths - apply clutch F for forward or R for reverse, plus the following: | | | | | | | | | | | | | | | | |
|---|---|---|---|---|---|---|---|---|---|---|---|---|---|---|---|---|
| | Clutches | | | Synchronizers | | | | | | | | | | | | |
| Speed | O | E | BC | 1 | 2 | 3 | 4 | 5 | 6 | 7 | 8 | 9 | 18 | L | M | H |
| 3 | X | | | | | X | | | | | | | | X | | |
| 4 | | X | | | | | X | | | | | | | X | | |
| 5 | X | | | | | | | X | | | | | | X | | |
| 6 | | X | | | | | | | X | | | | | X | | |
| 7 | X | | | | | | | | | X | | | | X | | |
| 8 | | X | | | | | | | | | X | | | X | | |
| 9 | | | X | | | | | | | | | X | | | | |
| 10 | X | | | X | | | | | | | | | | | X | |
| 11 | | X | | | X | | | | | | | | | | X | |
| 12 | X | | | | | X | | | | | | | | | X | |
| 13 | | X | | | | | X | | | | | | | | X | |
| 14 | X | | | | | | | X | | | | | | | X | |
| 15 | | X | | | | | | | X | | | | | | X | |
| 16 | X | | | | | | | | | X | | | | | X | |
| 17 | | X | | | | | | | | | X | | | | X | |
| 18 | | | X | | | | | | | | | | X | | | |
| 19 | X | | | X | | | | | | | | | | | | X |
| 20 | | X | | | X | | | | | | | | | | | X |
| 21 | X | | | | | X | | | | | | | | | | X |
| 22 | | X | | | | | X | | | | | | | | | X |
| 23 | X | | | | | | | X | | | | | | | | X |
| 24 | | X | | | | | | | X | | | | | | | X |
| 25 | X | | | | | | | | | X | | | | | | X |
| 26 | | X | | | | | | | | | X | | | | | X |

Preferences and options for a given aspect, feature or parameter of the invention should, unless the context indicates otherwise, be regarded as having been disclosed in combination with any and all preferences and options for all other aspects, features and parameters of the invention.

The listing or discussion of an apparently prior-published document in this specification should not necessarily be taken as an acknowledgement that the document is part of the state of the art or is common general knowledge.

The invention claimed is:

1. A dual-clutch transmission for a vehicle, comprising:

an odd gears clutch;

an odd gears shaft supporting at least two odd-numbered rotary gears, wherein the odd gears clutch is configured to transmit rotary input drive via a selected one of the odd-numbered rotary gears to a driven rotary shaft;

an even gears clutch;

an even gears shaft supporting at least two even-numbered rotary gears, wherein the even gears clutch is configured to transmit rotary input drive via a selected one of the even-numbered rotary gears to the driven rotary shaft, the driven rotary shaft, which is configured to be selectively connectable to one respective said odd- or even-numbered gear at a time and the odd and even gears clutches are arranged to transmit drive on a mutually exclusive basis, first and second range selection gears that are mutually exclusively releasably engageable to transfer drive from the driven rotary shaft to an output shaft so as selectively to permit selection of at least a first range transmission ratio or a second range transmission ratio between at least one said selected even or odd rotary gear and the output shaft to permit selection of a relatively low output ratio range or a first higher output ratio range that is higher than the relatively low output ratio range;

a first bypass drive line comprising at least two mutually engaged bypass rotary gears and a bypass clutch for selectively effecting driving engagement of at least two mutually engaged bypass rotary gears with the output shaft, the at least two mutually engaged bypass rotary gears when the bypass clutch is engaged giving rise to a first intermediate transmission ratio that is intermediate between the highest gear ratio of the relatively low output ratio range and the lowest gear ratio of the first higher output ratio range.

2. The dual-clutch transmission of claim 1, wherein the first bypass drive line comprises at least two pairs of mutually engaged rotary gears, at least two of which mutually engaged rotary gears are mounted on a bypass shaft and are selectively lockable thereto; and the dual-clutch transmission further comprises at least one bypass drive line selector that is capable of transmitting drive via one of the bypass shaft-mounted rotary gears at a time, the gear ratios resulting from transmission via the bypass shaft-mounted rotary gears differing from one another whereby the first bypass drive line is capable of giving rise to the first intermediate transmission ratio and a second intermediate transmission ratio.

3. The dual-clutch transmission of claim 2, wherein the bypass drive line selector comprises a dog clutch that is moveable along the bypass shaft selectively to lock one of the bypass shaft-mounted rotary gears to the bypass shaft.

4. The dual-clutch transmission of claim 2, further comprising a third range selection gear that is releasably engageable to drive the output shaft so as selectively to permit selection of a third transmission ratio between at least one said selected even or odd rotary gear and the output shaft whereby to permit selection of a second, higher output ratio range.

5. The dual-clutch transmission of claim 4, wherein the second, higher output ratio range is higher than the first relatively high output ratio range.

6. The dual-clutch transmission of claim 5, wherein the second intermediate transmission ratio is intermediate the highest gear ratio of the first higher output ratio range and the lowest gear ratio of the second higher output ratio range.

7. The dual-clutch transmission of claim 1, wherein the first bypass drive line includes a bypass clutch shaft having mounted thereon:

a bypass input gear that transfers rotary input drive to the bypass drive line;

the bypass clutch; and said bypass rotary gears.

8. The dual-clutch transmission of claim 1, further comprising an input drive shaft that is connected to a crankshaft of a spark-ignition or compression-ignition engine and that extends along the transmission generally parallel to the odd gears shaft and the even gears shaft that extend generally parallel to one another, the input drive shaft configured to provide rotary input drive to the dual-clutch transmission.

9. The dual-clutch transmission of claim 8, wherein the input drive shaft protrudes from the dual-clutch transmission as a power take-off (PTO) shaft.

10. The dual-clutch transmission of claim 8, wherein the input drive shaft includes secured thereto for co-rotation therewith an even gears drive gear that is drivingly engaged with an even gears shaft input gear providing rotary drive to a forward drive clutch that when engaged causes the selection of forward drive in the dual-clutch transmission.

11. The dual-clutch transmission of claim 10, wherein the forward drive clutch comprises a housing mounted for co-rotation with a housing of the even gears clutch.

12. The dual-clutch transmission of claim 11, wherein the housing of the forward drive clutch includes mounted thereon a first transfer rotary gear that is meshed with and provides rotary drive to a second transfer drive gear mounted for co-rotation with a housing of a reverse drive clutch.

13. The dual-clutch transmission of claim 12, wherein the housing of the reverse drive clutch is mounted for co-rotation with the housing of the odd gears clutch.

14. The dual-clutch transmission of claim 12, further comprising a first idler gear configured to transfer rotary drive between the first transfer rotary gear and the second transfer rotary gear.

15. The dual-clutch transmission of claim 1, further comprising two or more dog clutches configured to selectively engage drive to each said range selection gear.

* * * * *